(12) United States Patent
Bruemmer et al.

(10) Patent No.: US 8,972,053 B2
(45) Date of Patent: Mar. 3, 2015

(54) UNIVERSAL PAYLOAD ABSTRACTION

(75) Inventors: David J. Bruemmer, Carlsbad, CA (US); Curtis W. Nielsen, Carlsbad, CA (US); Benjamin C. Hardin, Vista, CA (US); Jonathan M. Whetten, Vista, CA (US)

(73) Assignee: 5D Robotics, Inc., Carlsbad, CA (US)

( * ) Notice: Subject to any disclaimer, the term of this patent is extended or adjusted under 35 U.S.C. 154(b) by 138 days.

(21) Appl. No.: 13/598,114

(22) Filed: Aug. 29, 2012

(65) Prior Publication Data
US 2013/0054024 A1 Feb. 28, 2013

Related U.S. Application Data

(60) Provisional application No. 61/529,206, filed on Aug. 30, 2011.

(51) Int. Cl.
*G06F 19/00* (2011.01)
*G06K 9/62* (2006.01)
(Continued)

(52) U.S. Cl.
CPC .......... *G06K 9/6293* (2013.01); *G06K 9/00791* (2013.01); *B25J 9/08* (2013.01); *G06F 3/016* (2013.01)
USPC ........... 700/245; 700/246; 700/247; 700/249; 700/253; 318/568.11; 318/568.12

(58) Field of Classification Search
USPC ......... 700/245, 246, 247, 248, 249, 251, 253, 700/254, 256, 258, 259, 262, 264; 318/568.11, 568.12, 568.21, 587; 719/311–321, 328
See application file for complete search history.

(56) References Cited

U.S. PATENT DOCUMENTS 4,980,626 A 12/1990 Hess et al.
5,655,148 A 8/1997 Richman et al.
(Continued)

FOREIGN PATENT DOCUMENTS

EP 1702365 A1 1/2001
EP 2036777 A1 3/2009
(Continued)

OTHER PUBLICATIONS

Héctor Alejandro Durán-Limón, A Resource Management Framework for Reflective Multimedia Middleware, Oct. 2001, Computing Department Lancaster University, UK, pp. 1-221.*
Vivekananthan Sanjeepan, A Service-Oriented, Scalable, Secure Framework for Grid-Enabling Legacy Scientific Applications, 2005, Master of Science, University of Florida, pp. 1-84.*
(Continued)

*Primary Examiner* — Khoi Tran
*Assistant Examiner* — Jaime Figueroa
(74) *Attorney, Agent, or Firm* — Martensen IP

(57) ABSTRACT

Robotic payloads are abstracted to provide a plug-and-play system in which mission specific capabilities are easily configured on a wide variety of robotic platforms. A robotic payload architecture is presented in which robotic functionalities are bifurcated into intrinsic capabilities, managed by a core module, and mission specific capabilities, addressed by mission payload module(s). By doing so the core modules manages a particular robotic platform's intrinsic functionalities while mission specific tasks are left to mission payloads. A mission specific robotic configuration can be compiled by adding multiple mission payload modules to the same platform managed by the same core module. In each case the mission payload module communicates with the core module for information about the platform on which it is being associated.

19 Claims, 5 Drawing Sheets

(51) Int. Cl.
*G06K 9/00* (2006.01)
*B25J 9/08* (2006.01)
*G06F 3/01* (2006.01)

(56) References Cited

U.S. PATENT DOCUMENTS

| | | | |
|---|---|---|---|
| 5,748,980 | A | 5/1998 | Lipe et al. |
| 5,889,926 | A | 3/1999 | Bourne et al. |
| 5,999,989 | A | 12/1999 | Patel |
| 6,092,021 | A | 7/2000 | Ehlbeck et al. |
| 6,216,631 | B1 | 4/2001 | Wissner-Gross |
| 6,226,692 | B1* | 5/2001 | Miloushev et al. ............ 719/316 |
| 6,675,070 | B2* | 1/2004 | Lapham ........................ 700/245 |
| 6,708,068 | B1 | 3/2004 | Sakaue |
| 6,889,118 | B2 | 5/2005 | Murray, IV et al. |
| 6,931,546 | B1* | 8/2005 | Kouznetsov et al. ............ 726/23 |
| 7,065,638 | B1* | 6/2006 | Chlytchkov ...................... 713/1 |
| 7,211,980 | B1 | 5/2007 | Bruemmer et al. |
| RE39,907 | E | 11/2007 | Hong |
| 7,584,020 | B2 | 9/2009 | Bruemmer et al. |
| 7,587,260 | B2 | 9/2009 | Bruemmer et al. |
| 7,620,477 | B2 | 11/2009 | Bruemmer et al. |
| 7,668,621 | B2 | 2/2010 | Bruemmer |
| 7,778,769 | B2 | 8/2010 | Boss et al. |
| 7,801,644 | B2 | 9/2010 | Bruemmer et al. |
| 7,877,198 | B2 | 1/2011 | Tenzer et al. |
| 7,974,738 | B2 | 7/2011 | Bruemmer et al. |
| 8,073,564 | B2 | 12/2011 | Bruemmer et al. |
| 8,112,203 | B2 | 2/2012 | Shin et al. |
| 8,155,868 | B1 | 4/2012 | Xing et al. |
| 8,190,319 | B2 | 5/2012 | Syed et al. |
| 2003/0171846 | A1* | 9/2003 | Murray et al. ................ 700/245 |
| 2005/0021186 | A1* | 1/2005 | Murray et al. ................ 700/245 |
| 2006/0074525 | A1 | 4/2006 | Close et al. |
| 2006/0117324 | A1 | 6/2006 | Alsafadi et al. |
| 2007/0206849 | A1 | 9/2007 | Sakata et al. |
| 2007/0208442 | A1* | 9/2007 | Perrone .......................... 700/95 |
| 2008/0009968 | A1* | 1/2008 | Bruemmer et al. ........... 700/245 |
| 2009/0082879 | A1* | 3/2009 | Dooley et al. ..................... 700/3 |
| 2011/0060495 | A1 | 3/2011 | Kono et al. |
| 2011/0208399 | A1 | 8/2011 | Fekete et al. |
| 2011/0224828 | A1* | 9/2011 | Breznak et al. ............... 700/264 |
| 2012/0041592 | A1* | 2/2012 | Murray et al. ................ 700/245 |

FOREIGN PATENT DOCUMENTS

| | | |
|---|---|---|
| WO | 2009007069 A1 | 6/2009 |
| WO | 2010011806 A1 | 1/2010 |
| WO | 2010134824 A1 | 11/2010 |
| WO | 2012/061932 A1 | 5/2012 |

OTHER PUBLICATIONS

Munich et al., ERSP: A Software Platform and Architecture for the Service Robotics Industry, international Conference on Intelligent Robots and Systems, 2005. (IROS 2005). 2005 IEEE/RSJ, Evolution Robotics, Inc., Pasadena, California, USA, pp. 1-8.*
Evolution Robotics, User's Guide ERSP 3.0, Robotic development Platform, 2001-2004, Pasadena California, pp. 1-163.*
Seyfarth et al.,Open System Architecture for Controls within Automation Systems, (OSACA) , 2005, pp. 1-11.*
Herman Bruyninckx, OROCOS: design and implementation of a robot control software framework, Apr. 2002, http://www.orocos.org, pp. 1-9.*
Brooks, Rodney A; Planning is Just a Way of Avoiding Figuring Out What to Do Next; MIT 1987.
Hester, Todd, et al; RTMBA; A Real-Time Model-Based Reinforcement Learning Architecture for Robot Control; Dept. of Computer Science, UT Austin, IEEE International Conference on Robotics and Automation; St. Paul, MN, USA May 2012.
Alur, R., et al.; A Framework and Architecture for Multirobot Coordination; GRASP Lab and SDRL Lab, University of Pennsylvania, Philadelphia, USA.
Ferrell, Cynthia; Robust Agent Control of an Autonomous Robot with Many Sensors and Actuators; MIT.
Fierro, Rafael, et al.; A Framework and Architecture for Multi-Robot Coordination; International Journal of Robotics Research 2002 21:977.
Kuipers, Benjamin, et al.; A Robot Exploration and Mapping Strategy Based on a Semantic Hierarchy of Spatial Representations; UT Austin; 8279 Robotics and Autonomous Systems 8(Nov. 1991), No. 1/2, Amsterdam, NL.
Bannach, David, et al.; Distributed Modular Toolbox for Multi-Modal Context Recognition; 1—UMIT, Hall in Tyrol, Austria; 2—Wearable Computing Lab, ETH Zurich, Switzerland.
Collins, Robert T., et al.; Algorithms for Cooperative Multisensor Surveillance; Proceedings of the IEEE. vol. 89, No. 10, Oct. 2001.
Fardi, Basel, et al.; Shape and Motion-Based Pedestrian Detection in Infared Images: A Multi Sensor Approach; Chemnitz University of Technology, Chemnitz, Germany; 2005 IEEE.
Kanade, Takeo, et al.; Advances in Cooperative Multi-Sensor Video Surveillance; Robotics Institute, Carnegie Mellon University, Pittsburgh, PA.
International Search Report and Written Opinion of the International Searching Authority; Jan. 22, 2013; PCT/US2012/053066.
International Search Report and Written Opinion of the International Searching Authority; Apr. 29, 2013; PCT/US2012/053056.
International Search Report and Written Opinion of the International Searching Authority; Apr. 24, 2013; PCT/US2012/053070.
International Search Report and Written Opinion of the International Search Authority; May 24, 2013; PCT/US2012/053077.

* cited by examiner

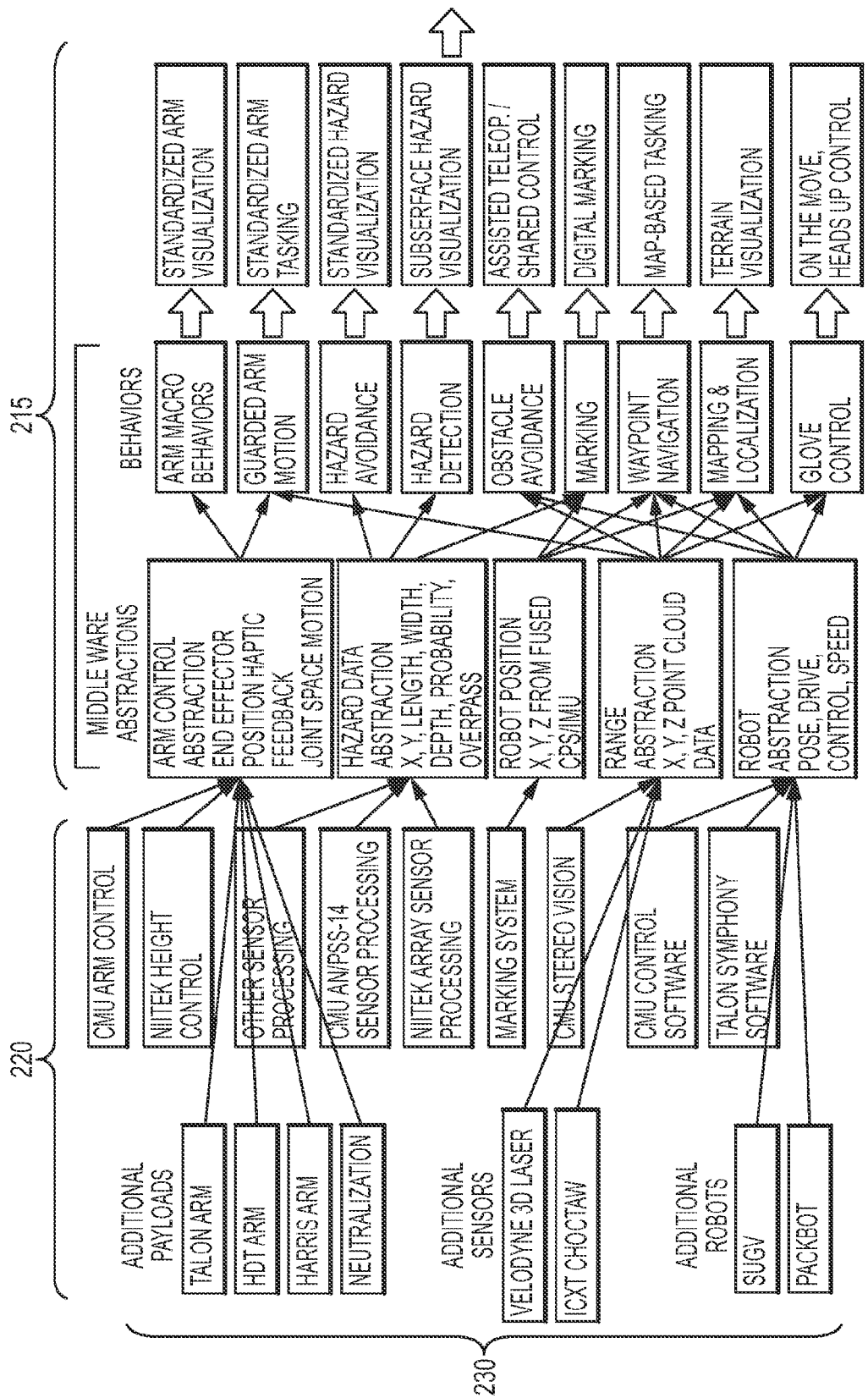

UNIVERSAL PAYLOAD ABSTRACTION

RELATED APPLICATION

The present application relates to and claims the benefit of priority to U.S. Provisional Patent Application No. 61/529,206 filed Aug. 30, 2011 which is hereby incorporated by reference in its entirety for all purposes as if fully set forth herein. The present application if further related to the following commonly assigned patent applications: U.S. patent application Ser. No. 13/597,791 entitled, "Asynchronous Data Stream Framework", U.S. patent application Ser. No. 13/597,911 entitled, "Vehicle Management System", U.S. patent application Ser. No. 13/597,991 entitled, "Modular Robotic Manipulation", and U.S. patent application Ser. No. 13/598,021 entitled, "Graphical Rendition of Multi-Modal Data, all of which filed on Aug. 29, 2012.

BACKGROUND OF THE INVENTION

1. Field of the Invention

Embodiments of the present invention relate, in general, to robotic hardware integration and more particularly to abstraction of robotic components enabling rapid reconfiguration and universal application of core capabilities.

2. Relevant Background

Robots are used for many purposes. Today robots are routinely found in industrial applications in which repetitive and otherwise monotonous task are efficiently undertaken by specialized machines. Robotic technology has also found applications in accomplishing tasks that are either undesirable to be performed by humans or are inherently dangerous.

For example robots are currently used to explore buildings during a fire enabling firefighters to determine if anyone is trapped within the structure without needlessly risking the life of the firefighter. Similarly robots are used in a wide variety of other dangerous application in which the risk of loss of human life or injury is significant. Robots can also be employed as toys and as devices by which to make our everyday tasks more enjoyable.

While the applications for robotic technology continues to grow and an expanding speed, and the hardware technology by which the robots accomplish these tasks are increasingly sophisticated, the underlying robotic architecture has remained relatively unchanged.

Each robotic device is essentially customer designed, built an utilized. And while several robots may be built to accomplish the same task, there is little ability for a robot to adapt to a different task. The underlying control system is very opaque. FIG. 1 is a typical robotic architecture 100 as would be known to one or reasonable skill in the robotic art. As shown, most robots include some robotic architecture 120 coupled to a variety of sensors 110 and actuators 130. The sensors collect data which is passed to the architecture. The architecture processes the data and, when appropriate, issues commands to one or more actuators.

While this type of "customized" approach works well for very critical tasks and specialized applications it does not offer any sort of wide utilization of core robotic technology. Using the model of the prior art, each robotic application must be customized, tested and built with little room for modifications and universal (or even expanded) applications. For example imagine a robotic device used to weld to pieces of metal together during the constructions of a automobile. Not only is such a process repetitive and monotonous it can be hazardous. However the robot is likely designed with a specific task in mind. Should the design of the car change, if is very likely that the robot will be unable to meet the needs of the new design. In which case the entire software controlling the robot and perhaps even the hardware components must be redesigned.

What is needed is a system and robotic architecture in which the fundamental robotic functionality of both software and hardware are abstracted so as to be universally applicable to a wide variety of robotic components. Such a system would enable a core intelligence module to be identical across a wide variety of payloads and tasks. These and other challenges of the prior art are addressed by one or more embodiments of the present invention.

SUMMARY OF THE INVENTION

Robotic payloads are abstracted to provide a plug-and-play system in which mission specific capabilities can be easily configured on a wide variety of robotic platforms. According to one embodiment of the present invention, a robotic payload architecture is presented in which robotic functionalities are bifurcated into intrinsic capabilities, managed by a core module, and mission specific capabilities, addressed by mission payload modules. By doing so the core modules manages a particular robotic platform's intrinsic functionalities while mission specific tasks are left to mission payloads. A mission specific robotic configuration can be compiled by adding multiple mission payload modules. In each case the mission payload module communicates with the core module for information about the platform on which it is being associated.

The present invention and robotic payload architecture of the present invention enables a mission generic robotic platform associated with particular core module to be associated with a wide variety of mission payloads depending on the assigned task. Likewise a mission payload, capable of carrying out a specific task, can be associated with a robotic platform best suited to the environment in which the mission payload must be employed. By providing independence between the mission payloads and core modules (robotic platform) robot configurations can be formed that efficiently address a mission task.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 5 depicts a high level block diagram of an abstraction of behavior modulation with respect to robotic capability and environmental constraints according to one embodiment of the present invention.

Figure 1:
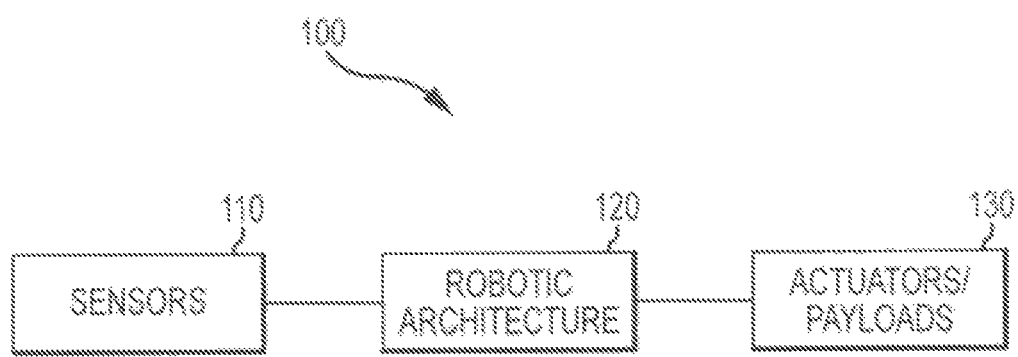
FIG. 1 shows a high robotic architecture according to the prior art and as would be known on one of reasonable skill in the relevant art.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Disclosed hereafter by way of example are one or more embodiments of a system and associated methodology for robotic payload hardware abstraction. According to one embodiment of the present invention, robotic hardware, specifically payload hardware, can be abstracted into a core module operable to provide intrinsic robotic functionality, and one or more mission payload modules. The mission payload module(s) are communicatively coupled to the core module to provide specific robotic capabilities according to various mission profiles while the core module provides intrinsic robotic information.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description and the accompanying drawings are provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

As will be appreciated by one of reasonable skill in the relevant art, robotic technology is widely used throughout industry and other social economic applications. In each case the robotic architecture and associated hardware are uniquely adapted to the mission for which the robot is designed. For example, one type of robot may be a single arm like after to assist in the repetitive and monotonous assembly of a particular component. Another type of robot may be mobile having either a wheeled base or track components enabling the robot to traverse distances before engaging in a specific task. Lastly another type of robot may employ leg like or arm like appendages to accomplish both mission tasks and mobility. One or more embodiments of the present invention enable core robotic functionality to be used seamlessly across each of these and other types of robotic applications. Specific mission payloads addressing various mission and hardware profiles can be matted with the core module to accomplish a specific goal. In such a manner the hardware payloads or other various components can be considered a plug-and-play type of component.

The embodiments of the present invention enable certain core functionality to be abstracted such that a variety of mission payloads can be controlled with the same core module. Accordingly, command-and-control software, navigation software, location information, and other intrinsic robotic functionality can be universally ported to a variety of mission payloads.

Likewise, different mission specific hardware components can be added and removed from robotic devices without having to modify or reprogram core functionality. According to another embodiment of the present invention, multiple mission payloads can share the command and control infrastructure and informational functionality provided by a core module.

Figure 2:
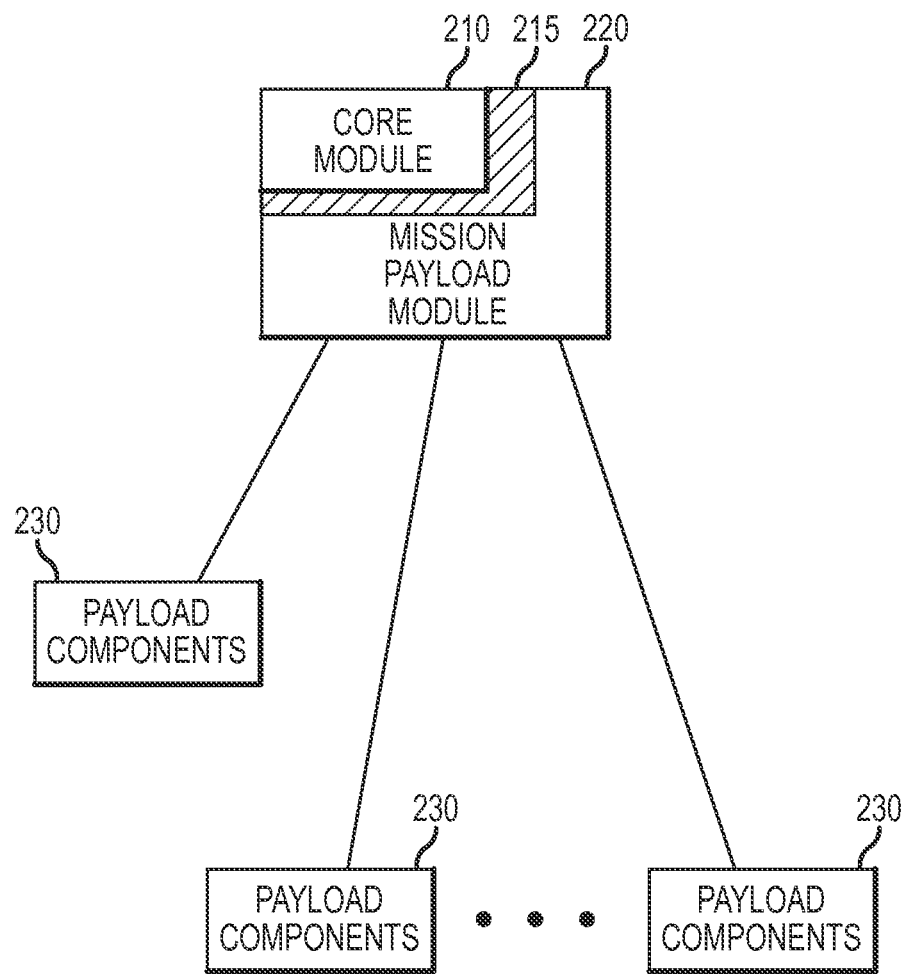
FIG. 2 is a high level block diagram of a robotic architecture having hardware abstraction according to one embodiment of the present invention.

FIG. 2 is an illustration, according to one embodiment of the present invention, of a high-level block diagram of a robotic payload architecture. A core module 210 interfaces with one or more mission payload modules 220. Each mission payload module 220 is thereafter associated with communicatively coupled with one or more payload components 230. A payload component, for example, can include a particular type of actuator or a particular type of mobility device such as a wheel or track drive such that enables the robot to accomplish its mission. In other embodiments of the present invention a payload component 230 can include a variety of sensors that collect and pass data back to both the mission payload module and, if necessary, the core module for analysis. The mission payload modules and associated payload components can be inexpensive and simplistic or be very sophisticated. For example one payload mission module may be provide the functionality to vacuum a room in a home. The payload module may include software to accomplish this task along with various hardware components such as a vacuum, some sort of mobility devices (wheels or tracks) and their associated drives, one or more sensors to identify basic obstructions and other components and processes required to accomplish its mission.

On the other hand another payload mission module may be associated with the task to determine the presence of toxic chemicals in an adverse environment. The processing and collection of such data is very complex requiring substantially more capabilities than the prior example. In addition the payload components must be customized to achieve the desired mission outcome. As before, the robot likely requires mobility but as it environment is adverse the type of hardware components and it deals with the terrain must be taken into account. Moreover, the sensors used to collect the information are also very sophisticated. In both cases core intrinsic functionality is carried out by the core module which works in concert with each mission payload module.

The core module 210 is, in one embodiment of the present invention, comprised of one or more processors conjoined for the purpose of executing intrinsic software that provides functional intelligence to drive the core system (i.e. base platform) as well as the functional intelligence to adapt the core system to a multiplicity of applicable mission payload modules. In addition the core module includes communication capability to enable the mission payload module 220 to communicate internally with the various internal components 230 as well as, if necessary, to other mission payload modules 220 and/or other core modules 210. Each of the internal components of the mission payload module connect to the inner side of the mission payload module's adapter plate 215 thereby allowing the external connection out from the mission payload module to consist of a single, standardized connection that in turn mates to a single standardized connection on the external facing side of the other module's adapter plate. Each core module can have between 1 and n adapter plates allowing between 1 and n payload mission modules to be attached. The design of the present invention allows data to flow throughout the modules that are connected. In essence, the adaptor plates 215 of each module 210 establishes a many to one data transmission conduit such that the internal components can be varied and non-standard (which allows a wide variety of custom and off the shelf components to be used) while the external mating scheme and standardized data stream remains constant. This standardized data stream which data can be transferred to and from the core module and the mission payload modules. In other embodiments of the present invention, that communicative capability of the core module 210 can establish a communication grid using USB connections, serial RS-232 connections, Bluetooth, and ultra wide-band connections. In particular, and according to one embodiment of the present invention, the core module 210 can employ a high-bandwidth high-performance low-power ultra wide-band chipset of the adapter plate 215 to provide short-range, high data rate conductivity.

The core module 210 provides the robot with basic robotic information. This can include data about the robot's size, shape, sensor location and orientation, speed profiles and even its maintenance history. It can also maintain records with respect to its use, user profiles and user interaction histories, data with respect to past missions including mission results. For example the core module for a particular robot may contain the robot's historical record of where it has been and what it has accomplished and, when the mission has been completed, the core module, and the data associated with that core module, can be removed and replaced. In another embodiment of the present invention the core module 210 further includes positioning capability comprising a combination of global positioning satellite technology, inertial sensors, tilt sensors, radio-frequency location sensors and other geospatial sensing capability to provide positional awareness. In addition the core module 210 can include long-range communication technology including satellite communication technology to enhance overall robotic functionality that can be leveraged by one or more mission payload modules.

Mission payload modules, by comparison, are mission centric. These payloads, by virtue of the core module, are robot independent. Since they do not include intrinsic functionalities and focus on mission specific tasks (those intrinsic functionalities being supplied by the core module) the mission payload modules can be run on any robot containing a core module. Thus a mission payload module, which, for example, possesses the ability of detecting chemicals, can in once instance be affiliated with robot designed for one environment and then be affiliated with another robot designed for a different environment. In another example one mission payload module may provide a dexterous seven degree of freedom robotic arm while another a hydraulic digger and yet another a simple two degree of freedom probe actuator. In each case the core module associated with those robots provide the instinct robotic functionality while the mission payload modules supply mission specific capability.

The mission payload module is thus task specific but robot generic while the core module is robot specific but task generic. Forming the connection between the core module 210 and n payload mission modules 220 are the adaptor plates 215 that arbitrate between the internal components of each module and the standardized mating scheme and standardized data stream that permits the modules to exchange information. The adapter plate includes configuration protocols that can modify and manipulate the functionality of the mission payload module 220 as utilized by the core module 210. With such a combination and delineation of responsibilities various robotic platforms, supported by a core module, can be matted with various mission payload modules to provide a plurality of cross platform opportunities. In addition, with the mission payload modules being specific to a particular task, a combination of mission payload modules can be combined to produce a robotic platform that is finely tuned to a specific mission. Similarly the adapter plate 215 can further massage the implementation of a payload mission module as associated with a core module so as to meet specific mission parameters without altering the inherent mission payload module capabilities. For example the functionality of a standard mission payload module coupled with a standard robotic platform having the same core module, can, nonetheless, have different functionality based on the adapter plate interposed between the core module and the mission payload module. Customization necessary from robot to robot or from task to task or even from company to company can be pushed to the adapter plates which are small and can be easily maintained, debugged and swapped out independent of the more complex core module. Accordingly, the robots being used are specialized for each task yet flexible enough to be reconfigured upon the task completion. Thus robots need not possess extra capabilities that result in inefficiency and underutilization.

The core module 210 further includes behavior processing technology that provides a software abstraction permitting each core module to be universally applicable to one or more mission payload modules 220. The behavior processing technology enables the core module 202 communicate with a plurality of mission payload modules using mission specific language and protocols and to send customize commands to drive each particular type of mission payload module, component or actuator. In an instance in which a particular robot and core module is affiliated with 2 or more mission payload modules the behavior abstraction ability of the core module assimilates various data inputs and directives and conveys them to other mission payload modules for appropriate action. For example two mission payload modules may provide direction to the core module that conflicts. The core module using its behavior processing technology weight each directive or request against core behaviors such as self preservation and overall mission objectives to determine the appropriate response for the robot.

By abstracting the core module 210 into a general instantiation, the present invention provide a robotic command/control/management capability that is identical across a plurality of robotic platforms. By doing so the robotic intelligence module is task generic in terms of hardware. The user need only add specific mission payload modules and necessary mission payload components to accomplish a specific task. Moreover the mission payload architecture of the present invention is plug and play. Mission payload components 230 can be quickly added to the each mission payload module 220 just as a mission payload module 220 can be quickly affiliated with a core module 210.

Figure 3:
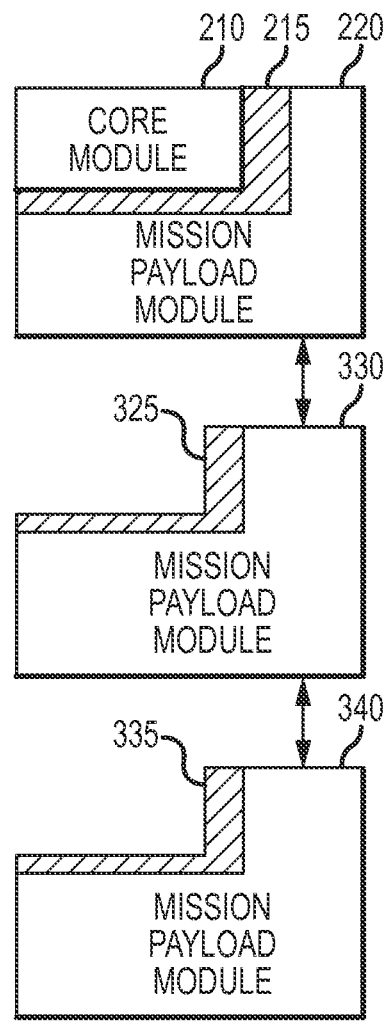
FIG. 3 is a high level block diagram illustrating the interchangeable and expansive capability of mission payload modules according to one embodiment of the present invention.

FIG. 3 is a high-level block diagram according to one embodiment of the present invention illustrating that a single core module 210 can be used to provide core intrinsic functionality for a plurality of mission payload modules 220, 330, 340. In the embodiment shown in FIG. 3, multiple mission payload modules can be interconnected to form a composite module capable of carrying out specific functionality or a specific mission task. Each mission module can connect to at least one other module but in most cases mission modules will have the ability to connect to at least two modules for expansion possible achieved by stacking the modules. An adaptor plate is used for each interface. As illustrated a primary mission payload module 220 is communicatively coupled to the core module 210 by coupling the adapter plate 215 from the core module 210 to the adapter plate 215 from the payload mission module 220 and a secondary and tertiary mission payload module 330, 340 via adapter plates 325, 335. In a similar fashion other mission payload modules can be linked to a single core module to carry out specific mission functionality. Each of these mission payload modules possess specific capabilities and are designed to accomplish a unique task and each communicate with the core module to provide instructions and gain information regarding the robotic environment in which it is being employed.

As shown in FIG. 2 and FIG. 3, each mission payload module and its associated core module can be associated with a plurality of payload components. The add-on payload components can include a wide variety of sensors such as chemical sensors, explosive sensors, optical or infrared sensors or any other similar type of technology applicable to a specific mission task.

Another advantage of the present invention is the ability to add or remove sensors (payload components) to a mission payload module seamlessly without affecting the intrinsic functionality of the core module and therefore the robot. As the core module and intrinsic functionality remain undisturbed, various sensor capabilities can be added and removed at will. For example a soldier in the field can remove a particular type of sensor from the robotic platform to conduct direct field investigation without disrupting the overall functionality of the remaining components and mission of the robot. Upon completion of the particular task with a particular sensor, the soldier can reattach the sensor either wirelessly or through wired components to again integrate the sensor with robotic platform.

The flexibility by which the present invention enables payload modules and various components to be added and removed from the robotic platform at will meaning that one standardized payload can be used across a variety of robotic platforms and for a variety of mission applications. Indeed a payload module need not have any physical connections with the core module but only need to establish a communication link with the associated robotic platforms by using the unique payload abstraction approach described in the present invention. By doings so a robot no longer needs be construed as a single unit with a fixed physical boundary. Rather the payload becomes removable from the body of the robot, not only for reconfiguration between missions, but also during the operation of the mission.

As will be appreciated by one of reasonable skill in the relevant art, the terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Included in the description are flowcharts depicting examples of the methodology which may be used to abstract robotic hardware. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Figure 4:
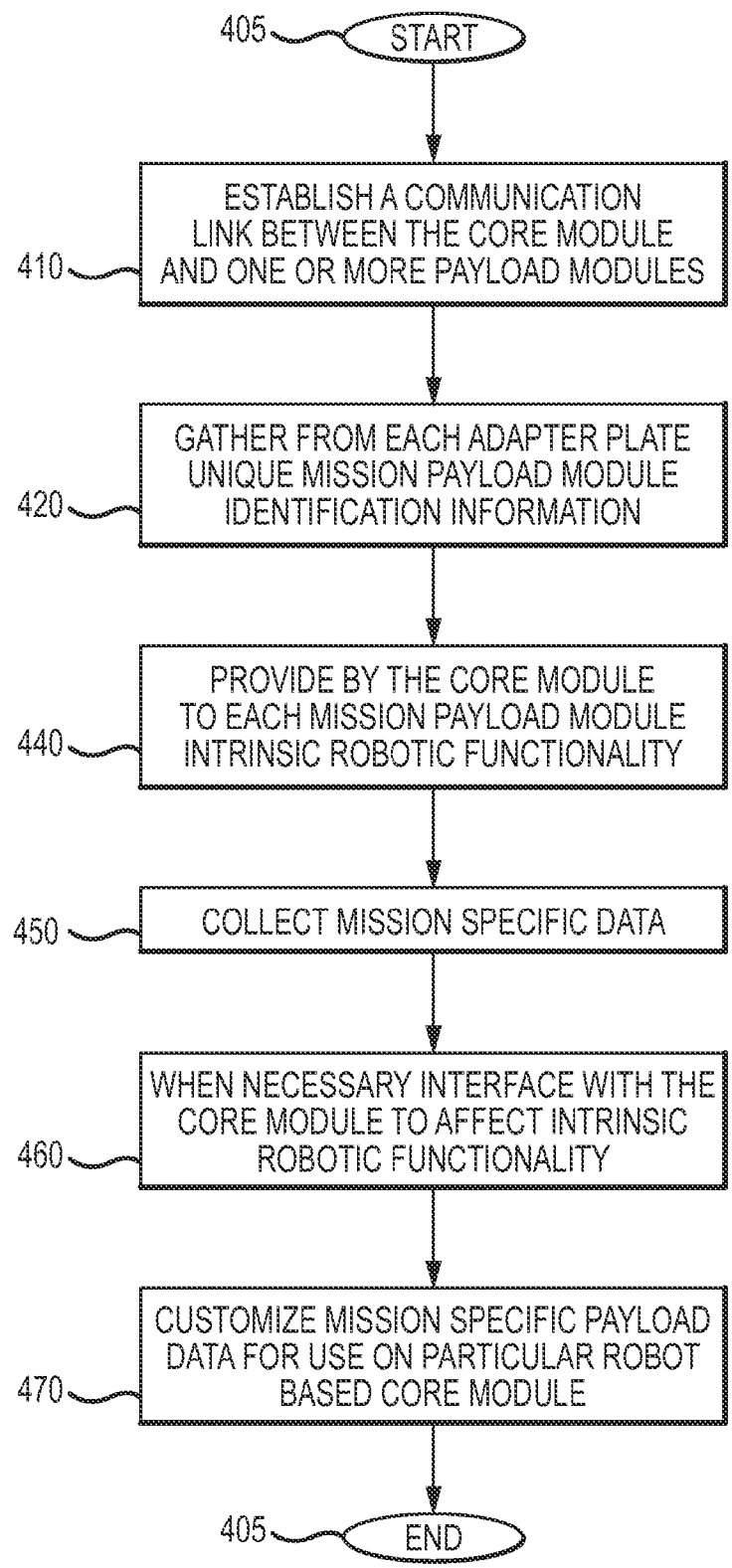
FIG. 4 is a flowchart of one embodiment of a method for abstracting intrinsic robotic functionality according to the present invention.

FIG. 4 is a high-level flowchart for robotic payload abstraction according to one embodiment of the present invention. The process begins 405 with the establishment of a communication link between a core module and one or more payload modules via an adapter plate 410. As described herein a core module is typically associated with a specific robotic platform. With such an association the core module controls and can provide to payload modules information with respect to the platform on which the payload module is being integrated.

Once linked with the core module, the mission payload module provides the core module with unique identification information 420 and in turn the core module conveys to each mission payload module intrinsic information relating to the platform on which the payload will be operating 440.

Once integrated the mission payload module through various payload components gathers information 450 and data unique to a specific mission application. In one instance of the present invention, sensor data is provided to the payload mission module for processing, analysis and action. That action may include a functionality that is intrinsic to the robot 460. For example, a payload mission module, upon collection of data, may need to have the robotic platform moved forward a specific distance. The payload mission module would therefore customize specific payload data for use by the core module 470, in this case, direction to the core module to relocate. The core module which manages and controls intrinsic capabilities of the robot and understanding the platform as it exists would direct the actuators to make such a movement. In another instance, the same payload module having the same request but being associated with a different core module and different platform would result in different actuation of components to achieve the same result. From the payload module's perspective, it is not concerned with the platform on which it rests. It simply needs to know how to present the data to the core module so as gain the desired result. In this example, the core module just knows it needs to move a certain distance and the payload module needs to understand how to convey that message. In other cases the payload module may customize messages based on the robot geometry, the robots current position, the robot's drive train to include speed and acceleration/deceleration capability, etc. From the core module's perspective, it is not concerned with why it has to move or perform other operations only that it has received a valid request to reposition the robot and it is capable of doing so.

The payload mission module of the present invention generally dictates the mission specific functionality of the robotic system while the core module provides a robot specific response. Incorporated within each mission payload module is an overall mission objective and required sensor components (payload components) necessary to accomplish a specific task. To accomplish the mission task the mission payload module generally includes powerful processors, behavior software, inertial sensing, and other engineering efforts to integrate collected sensor data.

Another aspect of the present invention is the ability of the system to automatically affect the behavior and application of the robot based on attached mission payloads. According to one embodiment of the present invention, the core module understands the capabilities of each mission payload attached to the robot. For example, the core module would ascertain whether a mission payload includes an actuator arm, a shovel, a sensor package, and the like. Moreover the core module of the present invention further understands where each individual payload is mounted on a particular robot and how that mounting affects not only the payload capability but the overall robot operation. Consider that a mission payload incorporating an arm or actuator mounted on the front of the robot may have a different reach profile as opposed to when the arm is mounted on the top or side of the robot. While the actual mission payload, the arm, remains the same as does the arms capability, the integration of the arm on the robot vastly changes the capability of the robot. Similarly a shovel mounted on the front may obscure other sensors associated with other mission payload packages. Or, adding different mission payloads to a robot may alter the robot's center of gravity such that the maximum speed or ability to traverse a certain environment may be dramatically changed from its intrinsic capability. The core module, comprehending the capabilities of each mission payload and its location, understands how the integration of various mission payloads will affect overall robotic capability. As the core module integrates each mission payload, it modifies and adjusts the robot's capability-based on how these mission payloads are attached.

To accomplish this sort of integration the system of the present invention includes a dedicated data-port coupling near each mounting position of a mission payload. Also associated with the data-port is a physical mounting bracket at which the mission payload will be attached and oriented. The data connection associated with the mounting bracket provides the core module with an understanding of what and where a mission payload is attached to the robotic system.

Another feature of the present invention is that the behavior and the application of a robot is affected by the various combinations of attached mission payloads. The present invention provides a core module comprised of a computer and a universal connection scheme that allows for a variety of other devices (mission payloads) to be attached to the robot. As has been previously described, each of these devices or mission payloads includes direct connections to sensors and actuators to accomplish specific tasks. Each has add-on capabilities that are networked back to the core module which is ultimately responsible for the actions of the overall robot. The core module incorporates and manages each discrete capability represented by one or more mission payloads.

Accordingly the core module must understand the capabilities and limitations of each mission payload. For example, whether the mission payload includes an actuator, an arm, a particular type of sensor, a shovel, or some other device and how that device will affect the overall capability of the robot.

The configuration and behavior of a robot based on the assemblage of a variety of mission payloads on a particular robotic platform hinges on the abstraction of both hardware and software. A hardware abstraction layer comprised of a universal mounting bracket and universal cabling as well as universal connectors to each mission payload enables a variety of mission payloads to be attached at any one of several locations on the robot. Likewise software abstraction layer comprising of an object oriented framework includes classes for the variety of sensors, robots, positioning systems, arms, and communication modules, and facilitates the physical connection of the hardware to the overall robotic architecture.

Data connectivity exists so as to allow for multiple data streams across a variety of communication scheme. For example RS-232 serial cable, RS 422 serial cabling, ethernets, CANbus networks and so forth may be employed by various hardware components on a single robotic platform. Robot specific information may be stored in the core module such that the robot can orchestrate certain behaviors depending on which devices are connected. And lastly the present invention enables the ability of the robotic platform to, on a real-time basis, modify its behavior according to either the removal or addition of mission payloads and their respective capabilities.

According to one embodiment of the present invention a core module of a robotic platform determines the behavior of the overall robotic platform based on the connected sensors, payloads and actuators based on a universal serial bus vendor ID and a product ID code that indicates not only what the device is capable of doing but its location, orientation, and other metadata information. Such data enables the core module to establish not only what the individual mission payload is capable of accomplishing but what the integrated robotic platform is operable to perform. As will be appreciated by one of reasonable skill in the relevant art other forms of identification and communication can be employed without departing from the scope of the present invention. For example programmable USB converters and extensions can be used as can other Bluetooth and Wi-Fi devices to assist in the identification and placement of a particular mission payload on a robotic platform. Also other radio frequency devices (Wi-Fi, Bluetooth, EWB) can use a plug and play system by scanning a particular network at regular intervals using ARP or Mac addresses to map those type of devices to a specific location. Alternatively hardcoded IP addresses or network locations can be placed into a robotic configuration to assist in identifying the capability and location of a specific device. In such a example the ID specifies the type of device, its capability and the port used on the robot so it can identify its location and orientation on the vehicle. Combined this sort of information can assist the core module to determine the robotic platform capability.

As previously described, the core modules is operable to provide the robotic platform with intrinsic robotic features. These features can include the storage of intrinsic information including: robotic maintenance history, software update history, hardware update history, robot geometry, robot drive attributes, communication options, robot use constraints, robot ownership, robot security and authentication information, robot navigation parameters, and the like. This data can be stored in media on board the core module in the form of configuration data that can be changed either during pre-mission or during run-time.

Likewise mission payload modules can store mission specific information including: mission behaviors, manipulation capabilities (arms, drivers, hands) mission constraints, mission sensor profiles, drivers for interfacing with multiple robots, mission behavior parameters and the like This mission can be stored on the mission payload modules in the form of a configuration data that can be changed either during pre-mission configuration or during run-time. Each of these type of parameters can affect the behavior of the payload.

Although automatic detection and adaptation of a variety of mission payloads is a hallmark of the present invention, the present invention also enables a user to specify when and how a particular device is to be connected and located on a particular robotic platform. This can occur as a one-time configuration command or even during runtime where shared mission requirements necessitate. In this manner, users can move sensors from one location on the robotic platform to another location without the need of reprogramming the mission payload capability but by simply altering its integration into the robotic platform.

FIG. 5 depicts a high level abstraction of behavior modulation with respect to robotic capability and environmental constraints. As can be seen by the variety of communication links between the various components 230 of a robotic platform, different levels of data in communication are exchanged between various components 230 to provide an overall robotic capability. Robot and environmental abstractions are combined with mission payload 220 capabilities to produce an overall robotic behavior. In this example the robotic platform may include a variety of mission payload capabilities such as a camera, mine detection device, geospatial location information, and other mission specific capabilities apart from the basic or intrinsic robot capabilities such as guarded motion and obstacle avoidance. Each of these capabilities and mission requirements work together within a robotic platform to accomplish a specific mission task and form the robot's response. In this example, an advanced min detection system mission payload 220 is comprised of a plurality of components 230. These include, for example, various arms, sensors, arm controls, sensors processing packages, marking systems, stereo vision hardware and software and the like. While the core module controls intrinsic features such as robot navigation the payload module 220 is designed for a specific task. The present invention integrates these complex task specific devices and control processes via an adapter plate 215. For example, the arm control, the hazard data processing and various behaviors are abstracted. The adapter plate abstracts the multiplicity of sensors and actuators into standardized data structures that can be passed through a single connection in the adapter plate 215.

The present invention incorporates the ability of a robotic platform, managed by core module, to accommodate a plurality of specific mission payloads to achieve flexible and diverse robotic capabilities By adapting and integrating various mission payloads, a robotic platform can be customize to achieve specific mission requirements and then, when necessary, reconfigured to accomplish a separate directive. Hardware and software components of the present invention are abstracted to provide a plug and play system to enhance overall capability and flexibility.

Upon reading this disclosure, those of skill in the art will appreciate still additional alternative structural and functional designs for a system and a process for robotic hardware abstraction through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

One or reasonable skill in the relevant art will appreciate that the present invention may be embodied in software executed on one or more computer systems. Computer systems typically have a number of devices coupled to a system bus or motherboard, including at least one microprocessor, at least one bus, a system memory, an input device such as a keyboard controller and an output device such as video monitor display controller. In the present invention both the core module and the payload mission model include processors by which to collect and analyze data.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A system for robotic hardware abstraction, comprising:
a core module operable to provide abstract intrinsic robotic functionality and one or more core behaviors;
one or more mission payload modules communicatively coupled to the core module wherein each mission payload module is customized for a class of tasks and wherein each mission payload module can operate with any core module; and
an adapter plate communicatively interposed between the core module and each of the one or more mission payload modules wherein the adapter plate includes a storage medium and processor capable to store and communicate to the core module unique mission payload module configuration protocols associated with each of the one or more payload modules that manipulates mission payload module functionality.

2. The system for robotic hardware abstraction according to claim 1, wherein each mission payload module is operable to complete a mission specific capability.

3. The system for robotic hardware abstraction according to claim 1, wherein functionality of the one or more mission payloads as coupled with the core module is based on the configuration protocols of the adapter plate.

4. The system for robotic hardware abstraction according to claim 1, wherein the core module is configured to provide geospatial location information.

5. The system for robotic hardware abstraction according to claim 1, wherein a communication grid is formed among the core module, the adapter plate, and the one or more mission payload modules.

6. The system for robotic hardware abstraction according to claim 1, wherein intrinsic robotic functionality includes behavior processing operable to resolve conflicting instructions from the one or more mission payload modules.

7. The system for robotic hardware abstraction according to claim 1, wherein intrinsic robotic functionality includes navigational capabilities.

8. The system for robotic hardware abstraction according to claim 1, wherein the adapter plate provides to the core module specific information associated with the one or more mission payload modules to enable the one or more mission payload modules to carry out mission specific tasks.

9. The system for robotic hardware abstraction according to claim 1, wherein the one or more mission payload modules provides to the core module normalized mission specific data.

10. The system for robotic hardware abstraction according to claim 1, wherein the core module is operable to provide intrinsic robotic functionality to two or more mission payload modules simultaneously and wherein the core module includes a behavior engine operable to weigh requests from each of the two or more mission payload modules against the one or more core behaviors and determine an appropriate response.

11. The system for robotic hardware abstraction according to claim 1, wherein the adapter plate includes a data connection that determines on which communication port the one or more mission payloads modules communicates with the core module.

12. The system for robotic hardware abstraction according to claim 11, wherein the adapter plate includes an ultra wide band transceiver to establish a communication link between the one or more mission payload modules and the core module.

13. In a computing system characterized by one or more mission payload modules communicatively coupled to a core module via an adapter plate, a method for hardware abstraction, the method comprising:
establishing a communication link between the one or more mission payload modules and the core module via the adapter plate;
gathering, by the adapter plate, from each mission payload module unique payload identification information;
providing to the core module, by the adapter plate, specific mission payload module configuration protocols that manipulates mission payload module functionality;
providing, by the core module to the one or more mission payload modules via the adapter plate, intrinsic robotic functionality;
collecting, by the one or more mission payload modules, mission specific data; and
responsive to one or more of the payload modules requiring intrinsic robotic functionally, interfacing with the core module by the payload module to affect intrinsic robotic functionality wherein each mission payload module can interface and operate with any core module.

14. The method for hardware abstraction according to claim 13, wherein the identification information within the adapter plate describes to the core module characteristics of the mission payload module.

15. The method for hardware abstraction according to claim 13, wherein intrinsic robotic functionality includes communication and location capabilities.

16. The method for hardware abstraction according to claim 13, wherein intrinsic robotic functionality includes behavioral processing operable to resolve conflicts between the one or more mission payload modules.

17. The method for hardware abstraction according to claim 13, further comprising providing, by the core module to the one or more payload modules, geospatial location information.

18. The method for hardware abstraction according to claim 13, further comprising managing, by the core module, local and wide area data transmissions.

19. The method for hardware abstraction according to claim 13, further comprising interfacing one or more mission specific sensors with the one or more mission payload modules by a unique adapter plate resulting in a unique capability set.

* * * * *